United States Patent Office 2,857,359
Patented Oct. 21, 1958

2,857,359

PROCESS FOR PREPARING THIXOTROPIC POLY-ESTER RESIN COMPOSITION AND PRODUCT OBTAINED THEREBY

Francis Schollick, Oldswinford, Stourbridge, and Brian York Downing, Blackheath, near Birmingham, England, assignors to American Cyanamid Company, New York, N. Y., a corporation of Maine No Drawing. Application December 20, 1955
Serial No. 554,131

Claims priority, application Great Britain December 29, 1954

7 Claims. (Cl. 260—45.4)

Unsaturated polyester resin compositions are well known in the plastics industry. The type of such compositions with which the present invention is concerned usually comprises an amorphous alkyd resin made from an $\alpha,\beta$-unsaturated dibasic acid reacted with a dihydric alcohol such as propylene glycol or ethylene glycol. Part of the unsaturated acid may be replaced by a saturated dibasic acid and/or a minor proportion of a monobasic acid, and a minor proportion of the glycol may be replaced by pentaerythritol or another polyhydric alcohol and/or a monohydric alcohol. Generally the composition comprises the resin dissolved in an unsaturated co-polymerisable monomer, such as styrene, to form a viscous homogeneous liquid.

The unsaturated polyester resin compositions may be used as binders for fibrous materials, e. g. fibres of glass or other substance, either as such or as rovings or the like, mats or woven fabrics, to produce shaped articles in which the resin composition, with the addition of a suitable catalyst, is finally polymerised or cured.

In particular, the resin composition in a liquid state may be applied to shaped forms of the fibrous material by spraying or spreading or rolling. In some cases the shaped form may have vertical or sloping surfaces. The difficulty then arises that the resinous liquid tends to run from upper to lower levels resulting in lack of uniformity of resin distribution.

A number of filling materials have hitherto been used for the purpose of reducing the flow of the resin composition. Examples of these are siliceous materials such as clays, various forms of silica, pigments, calcium carbonates and metallic oxides e. g. iron oxide. There are various drawbacks to the use of fillers viz:

(1) The use of a filler may interfere with the cure or with the curing time of the resin composition in the shaped article;

(2) Such a substantial quantity of filler may be required to be incorporated as to increase unduly the specific gravity of the material of the shaped article. This is undesirable because lightness combined with strength is one of the advantages of shaped articles made from resin and fibres such as glass fibres.

(3) Shaped articles of certain kinds made from resin and fibres such as glass fibres may be for use in the radio, television and radar field where transparency to visual light and high frequency radiation is required. Fillers impair the transparency and cause degradations in electrical properties such as an increase in power factor and other dielectric losses at high frequencies.

An object of the present invention is to obviate the need to incorporate fillers but not necessarily to exclude their use entirely, in order to produce unsaturated polyester resin compositions with a reduced tendency to flow when applied to fibrous materials. More particularly the object is to provide an unsaturated polyester resin composition having inherent thixotropic properties.

The object of the invention is achieved by producing a composition which contains a crystalline as well as an amorphous unsaturated polyester resin. A composition, which is a stable dispersion, is obtainable according to the invention by heating the crystalline resin with or without a solvent for the amorphous resin, preferably a copolymerisable monomer, to a temperature sufficiently high to soften and liquefy it to a cloudy liquid, but not so high as to convert it to a homogeneous clear liquid, and then mixing this cloudy liquid with the amorphous resin in solution in a copolymerisable monomer with or without the simultaneous or subsequent addition of further copolymerisable monomer. Alternatively, according to the invention, the crystalline resin and the solvent may be heated to form a clear solution, the mixture being allowed to cool until crystallisation begins, whereupon the amorphous resin is added with or without the simultaneous or subsequent addition of further polymerisable monomer. If a highly crystalline resin is used, such as ethylene fumarate for example, the process may be carried out merely by mixing the crystalline resin in the molten state with the amorphous resin as such, and not necessarily in solution in a polymerisable monomer, in which case a polymerisable monomer is added subsequently. In any case, it is preferred to add at least some polymerisable monomer as the hot mixture of crystalline and amorphous resins is cooling.

It will be understood that by virtue of its thixotropic properties the composition according to the invention will have a temporary reduction in apparent viscosity when subjected to shearing forces. Therefore, when applied with pressure by means of rollers or other spreading device to a fibrous shape, the composition will readily penetrate among the fibres but will quickly regain its viscosity so that it will not run or flow. The composition may be thinned to a considerable extent by the addition of a low viscosity solvent or monomer but obviously there is a limit to this or the thixotropic properties would be destroyed.

A further advantage of the polyester resin composition having thixotropic properties is that it possesses good suspending properties for pigments, and for fillers if it should be desired to add them. Pigments dispersed in amorphous polyester resin compositions have a tendency to settle out.

The production of amorphous resinous unsaturated polyester compositions is well known and in this connection reference may be made to British specification 656,138. An example is given hereinafter.

It is also known to produce crystalline unsaturated alkyd resin compositions and in this connection reference may be made to British specification No. 644,287. Such crystalline resins are completely soluble, only at elevated temperatures, in diallyl phthalate, styrene or other vinyl monomer. On cooling the solution, the crystalline resin will separate out. The resin will also crystallise out on cooling a solution in an inert solvent such as xylene. It will slowly crystallise by itself in the absence of an added solvent, and this may be helped by adding a crystallising agent such as asbestine, a natural, white, fibrous magnesium silicate (Handbook of Material Trade Names by Zimmerman & Lavine, 1953, page 66). A resin, produced according to Example 1 of specification No. 644,287 from ethylene glycol and fumaric acid, is highly crystalline and may be compounded in the molten state with an amorphous unsaturated polyester resin composition by mere admixture to obtain a composition which, when thinned with the solvent for the amorphous resin, will have thixotropic properties according to the present invention.

Details of the invention will now be given by way of example, starting with the preparation of the amorphous and crystalline resins to be used.

AMORPHOUS RESIN SOLUTIONS

Resin M

| | Parts by weight |
|---|---|
| Propylene glycol | 502 |
| Fumaric acid | 464 |
| Phthalic acid anhydride | 296 |

These are heated at about 200° C. in an atmosphere of carbon dioxide to an acid number of 40 to 45. The viscosity of the resin at this point as a 70% solids solution in butyl acetate is Y—Z on the Gardner-Holdt scale. 13.6 parts by weight of pentaerythritol is added and the reaction mixture is then heated for an additional two hours. The viscosity of the final product is Z3 when measured as a 70% solids solution in butyl acetate. 0.13 part by weight of hydroquinone is added and the polyester is cold cut with half its weight of styrene to form the solution.

Resin N

This is the same as Resin M except that 312 parts by weight of the solid resin are cut with 188 parts by weight diallyl phthalate.

Resin O

This is an amorphous resin solution in styrene known in the trade as Beetle Polyester Resin 4128 an unsaturated polyester resin prepared by reacting propylene glycol, fumaric acid and phthalic anhydride cut to 2/1 polyester to styrene ("Beetle" being a registered trademark).

Example II shows the use of the amorphous resin as such, and not dissolved in styrene.

CRYSTALLINE RESIN

Resin C1

| | Parts by weight |
|---|---|
| Ethylene glycol | 325 |
| Fumaric acid | 460 |
| Adipic acid | 116 |

These are charged into a suitable reaction vessel and heated in an atmosphere of inert gas, such as carbon dioxide, to a temperature of 200° C. in nine hours. The temperature is held at 195° C. to 200° C. until the resin has an acid value of 35. The resin is cooled and 0.185 part by weight of hydroquinone is added. The resin is then discharged into a tray to cool. 4 parts by weight of the resin are heated in a vessel to 120° C. and one part by weight diallyl phthalate is blended with it. The resin is allowed to cool and crystallise overnight at room temperature. It forms a wax like solid.

Resin C2

This is prepared in the same way as Resin C1 but instead of heating 4 parts by weight of the resin from the tray with diallyl phthalate they are heated to 80° C. and blended with one part by weight of styrene (monomer). On cooling and crystallising overnight at room temperature it forms a stiff white crystalline product.

Resin C3

| | Parts by weight |
|---|---|
| Ethylene glycol | 373 |
| Fumaric acid | 580 |
| Sebacic acid | 202 |

These are charged into a suitable reaction vessel such as a stainless steel kettle in an atmosphere of an inert gas such as carbon dioxide, and heated for 10 hours at 160° C., 5 hours at 180° C. and 7 hours at 200° C., producing a resin of acid value of 46.2. There is then added 0.235 part by weight of hydroquinone. On cooling to room temperature the resin crystallises to an opaque white solid. 4 parts of this resin are heated to 80° C. and blended with 1 part by weight of monomeric styrene. The final resin is then allowed to cool. Example 8 shows the use of the opaque resin obtained before it is blended with styrene.

Resin C4

186 parts by weight ethylene glycol
348 parts by weight fumaric acid

These are heated in a suitable reaction vessel under a blanket of inert gas such as nitrogen. The temperature is maintained at about 160–180° C. for about 35 hours, during which time water of condensation is removed. A thick resinous product having an acid number of 52 is obtained. There is then added 0.043 part by weight of hydroquinone. On allowing to stand at room temperature (or at 85–90° C. according to specification No. 644,287) an opaque crystalline product is obtained.

This resin may be used without previously crystallising with a copolymerisable monomer. It also allows the preparation of thixotropic dispersions by simple blending when molten with the amorphous resins as shown in Example 10, or by blending the crystalline and amorphous resins together when molten, followed by thinning with the copolymerisable monomer, see Example 11.

The following table of Examples 1–7 gives particulars of compositions made according to the invention from the resin M on the one hand and the resin C1, C2 or C3 on the other hand. In the preparation of each of the compositions the appropriate crystalline alkyd resin C1, C2 or C3 is heated on a water bath to a temperature just above its liquefying point (about 55–60° C.) and held at this temperature until melted to a turbid liquid, and then removed from the water bath. The cold resin M is added slowly with stirring, the temperature falling to about 35° C. The styrene is then added slowly and the resin allowed to cool to room temperature in 2–3 hours.

It has been found necessary not to heat the crystalline resins C1, C2 and C3 to too high a temperature; their crystalline structure is thereby destroyed, the thixotropic effect is lost and an inferior product is obtained. It has been found possible with resins C1, C2, and C3 to hold them at about 55° C. whilst adding the amorphous resin instead of letting the mixture cool to 35° C. as indicated above. It may, however, be undesirable to hold the mixture at temperatures of the order of 55–60° C. for a prolonged period owing to the risk of premature gelation of the resin mixture. It will be appreciated that there are a number of ways of varying the procedure always provided that the crystalline resin is not allowed to liquefy to an homogeneous liquid. The proportions are given as parts by weight.

| Example No | 1 | 2 | 3 | 4 | 5 | 6 | 7 |
|---|---|---|---|---|---|---|---|
| Resin C1 | 150 | | 150 | | | | |
| Resin C2 | | 150 | | | | 150 | 150 |
| Resin C3 | | | | 150 | 150 | | |
| Resin M | 150 | 500 | 75 | 250 | 750 | 150 | 150 |
| Styrene | 50 | 50 | 150 | 50 | 50 | 50 | 100 |

The following is a description of the physical condition of the compositions of Examples 1–7 on cooling to room temperature and allowing to stand for 24 hours. No change in any of the resin compositions occurred after storage for 6 weeks and more.

1. Thixotropic resin of a buttery consistency.
2. Similar to 1.
3. Similar to 1.
4. Similar to 1.
5. Similar to 1.
6. A very stiff thixotropic resin.
7. Similar to 1.

EXAMPLE 8

This example illustrates a procedure in which the C3 resin is used before being blended with styrene and being allowed to crystallise out. The blending with styrene is part of the procedure but the Resin M is added as soon as the hot solution has cooled to the point where crystallisation begins to occur.

| | Parts by weight |
|---|---|
| Resin C3 (before blending with styrene) | 100 |
| Styrene | 25 |
| Resin M | 200 |
| Styrene | 30 |

The resin C3 is heated until melted and blended with the first quantity of styrene to yield a completely homogeneous solution at 100° C. On cooling and stirring the resin becomes cloudy and crystallisation begins to take place. Resin M is then added with stirring, followed by the second quantity of styrene. The composition is stirred and allowed to cool to room temperature when the composition becomes highly thixotropic.

EXAMPLE 9

| | Parts by weight |
|---|---|
| Resin C1 | 200 |
| Resin N | 312 |
| Di-allyl phthalate | 66 |

Resin C1 is heated to 58° C. and Resin N is added cold with stirring. The temperature of the mixture falls to 43° C. and the diallyl phthalate is then added and stirred into the mixture. When cooled to room temperature a stiff thixotropic paste is produced.

EXAMPLE 10

| | Parts by weight |
|---|---|
| Resin C4 | 60 |
| Resin O or M | 60 |
| Styrene | 50 |

The Resin C4 is heated to 110° C. when it melts to a homogeneous liquid. The resin is allowed to cool to 90° C. at which temperature the Resin O or the Resin M at a temperature of 60° C. is added rapidly; a clear resin solution is obtained. The resin mixture is allowed to cool to 60° C. when crystallisation occurs. Addition of the styrene with stirring produces a highly thixotropic dispersion in the case of each resin mixture.

EXAMPLE 11

| | Parts by weight |
|---|---|
| Resin C4 | 60 |
| Resin O (without styrene) | 40 |
| Styrene | 70 |

Resins C4 and O above are melted together at 110° C. until a clear homogeneous liquid is obtained. The resins are cooled to 90° C. and 30 parts by weight of styrene is added. On cooling to 65° C. crystallisation begins and the remainder of the styrene is then added with stirring. The composition is allowed to cool to room temperature and to stand overnight. A dispersion with slightly thixotropic properties—much less marked than Example 10—is obtained.

The thixotropic properties of the examples have, for the most part, been judged by manual stirring of the samples or by the manner in which they behave on allowing them to flow from a spatula.

However, the following example clearly demonstrates the thixotropic properties:

EXAMPLE 12

| | Parts by weight |
|---|---|
| Resin C4 | 100 |
| Styrene | 25 |
| Resin O | 200 |
| Styrene | 30 |

Resin C4 is melted and blended with 25 parts of styrene to yield an homogeneous solution at 100° C. The solution is cooled until at 65° C. crystallisation begins. At this stage Resin O is added with stirring, followed by the 30 parts of styrene. The thixotropic dispersion is allowed to cool and stand overnight. The thixotropic characteristics are shown by the results, tabulated below, as obtained on a Ferranti viscometer. This viscometer enables the determination of viscosities or apparent viscosities at different rates of shear, and for their investigation at a given rate of shear at various time intervals. The experiment was carried out at 25° C.; timing being started from the maximum viscometer reading.

| Time in minutes | Rate of Shear, sec.$^{-1}$ | Apparent Viscosity, poises |
|---|---|---|
| 0 | 125.4 | 18.05 |
| ½ | 125.4 | 16.8 |
| 1 | 125.4 | 16.1 |
| 2 | 125.4 | 15.5 |
| 4 | 125.4 | 14.0 |
| 6 | 125.4 | 13.4 |
| 8 | 125.4 | 13.0 |
| 8 | 11.84 | 14.15 |
| 8½ | 11.84 | 14.55 |
| 9 | 11.84 | 14.75 |
| 10 | 11.84 | 15.2 |
| 12 | 11.84 | 15.45 |
| 13 | 11.84 | 15.45 |

These results demonstrate the thixotropic character, namely, the variation in apparent viscosity with time and under different shearing stresses.

The methods of curing unsaturated polyester compositions consisting essentially of a solution of the unsaturated polyester resin and copolymerisable monomer are well known and these may also be used for the compositions described in the invention. Catalysts such as organic peroxides, e. g. benzoyl peroxide, and methyl ethyl ketone peroxide may be used with or without promoters such as organic cobalt salts or amines such as di-ethyl aniline according to the curing temperatures to be used.

In the case of amorphous polyester resins comparable cured products may be obtained either by curing at high temperatures, e. g. 100–150° C., or at room temperatures provided suitable catalyst systems are used in each case; however a considerable difference between high and low temperature curing is shown in the case of the thixotropic compositions as is illustrated in the following example.

EXAMPLE 13

To 100 parts by weight of the thixotropic composition prepared according to Example 4 are added separately with stirring, 2 parts by weight of a 60% solution of methyl ethyl ketone peroxide in dimethyl phthalate and 0.8 part by weight of a solution of cobalt naphthenate in mineral spirits corresponding to 1.0% cobalt metal content in the solution. The mixture is spread in a layer approximately ⅛" thick onto two glass plates and covered to exclude air.

One plate is left to cure at room temperature overnight; on removal a strong rigid translucent plate of resin is obtained.

The second plate is placed in an oven at 60° C. and allowed to cure there for three hours; a strong rigid clear and transparent plate of resin is obtained on cooling and removing from the glass plate.

The mixture of this example is used to impregnate a layer of glass fibre mat on an aluminium former such that the layer is in a substantially vertical plane. After impregnation there is no sign of the resin mixture running down the glass mat. The composite of glass mat and resin is cured to a hard tough laminate in a few minutes by exposure to a bank of 6 "infra red" heating lamps situated at a distance of 2 feet from the aluminium former. There is no sign of the resin flowing down the glass mat during the curing process.

What is claimed is:

1. A process for preparing a substantially thixotropic composition comprising heating a crystalline polyester resin to a temperature such that it softens and liquefies to form a cloudy liquid, and mixing with said liquid an amorphous unsaturated polyester resin in solution with a copolymerizable monomer containing a $CH_2=C<$ group, wherein said crystalline polyester resin is prepared by reacting fumaric acid with a symmetrical glycol having the general formula $HO(CH_2)_xOH$ in which $x$ is a whole even number from 2–18, inclusive, and said amorphous polyester resin is the reaction product of an $\alpha,\beta$-ethylenically unsaturated dicarboxylic acid and a glycol.

2. The product produced according to the process of claim 1.

3. A process for preparing a substantially thixotropic composition comprising heating a crystalline polyester resin to a temperature such that it softens and liquefies to form a cloudy liquid, and mixing with said liquid an amorphous unsaturated polyester resin in solution with monomeric styrene, wherein said crystalline polyester resin is prepared by reacting fumaric acid with a symmetrical glycol having the general formula $HO(CH_2)_xOH$ in which x is a whole even number from 2–18, inclusive, and said amorphous polyester resin is the reaction product of an $\alpha,\beta$-ethylenically unsaturated dicarboxylic acid and a glycol.

4. The product produced according to the process of claim 3.

5. A process for preparing a substantially thixotropic composition comprising heating a crystalline polyester resin to a temperature such that it softens and liquefies to form a cloudy liquid, and mixing with said liquid an amorphous unsaturated polyester resin in solution with monomeric diallylphthalate, wherein said crystalline polyester resin is prepared by reacting fumaric acid with a symmertical glycol having the general formula $HO(CH_2)_xOH$ in which $x$ is a whole even number from 2–18, inclusive, and said amorphous polyester resin is the reaction product of an $\alpha,\beta$-ethylenically unsaturated dicarboxylic acid and a glycol.

6. The product produced according to the process of claim 5.

7. A process for preparing a substantially thixotropic composition comprising heating a crystalline polyester resin to a temperature such that it softens and liquefies to form a cloudy liquid, and mixing with said liquid an amorphous unsaturated polyester resin in solution with a copolymerizable monomer containing a $CH_2=C<$ group and adding thereto a curing catalyst, wherein said crystalline polyester resin is prepared by reacting fumaric acid with a symmetrical glycol having the general formula $HO(CH_2)_xOH$ in which $x$ is a whole even number from 2–18, inclusive, and said amorphous polyester resin is the reaction product of an $\alpha,\beta$-ethylenically unsaturated dicarboxylic acid and a glycol.

References Cited in the file of this patent

UNITED STATES PATENTS 2,255,313    Ellis               Sept. 9, 1941

FOREIGN PATENTS 644,287    Great Britain        Oct. 11, 1950

OTHER REFERENCES

D. N. Buttrey, "Plasticizers," published by Cleaver Hume (London) 1950. (Page 25 relied on.)